(12) United States Patent
Plessis et al.

(10) Patent No.: US 8,719,074 B2
(45) Date of Patent: May 6, 2014

(54) EDITOR AND METHOD FOR EDITING FORMULAE FOR CALCULATING THE PRICE OF A SERVICE AND A SYSTEM FOR AUTOMATIC COSTING OF A SERVICE

(75) Inventors: Frédéric Plessis, Epron (FR); Christophe Trompette, Herouville-Saint-Claire (FR)

(73) Assignee: SAP AG, Walldorf (DE)

(*) Notice: Subject to any disclaimer, the term of this patent is extended or adjusted under 35 U.S.C. 154(b) by 1541 days.

(21) Appl. No.: 10/524,534

(22) PCT Filed: Aug. 13, 2002

(86) PCT No.: PCT/FR02/02873
§ 371 (c)(1),
(2), (4) Date: Oct. 12, 2005

(87) PCT Pub. No.: WO2004/016066
PCT Pub. Date: Feb. 26, 2004

(65) Prior Publication Data
US 2006/0155654 A1 Jul. 13, 2006

(51) Int. Cl.
*G06F 17/00* (2006.01)
(52) U.S. Cl.
USPC .............................. 705/7.35; 705/400; 705/26
(58) Field of Classification Search
USPC ............ 705/400, 1, 10, 20; 717/113; 707/103
See application file for complete search history.

(56) References Cited

U.S. PATENT DOCUMENTS

| | | | | |
|---|---|---|---|---|
| 4,205,371 A | * | 5/1980 | Feather | 1/1 |
| 4,719,571 A | * | 1/1988 | Rissanen et al. | 1/1 |
| 5,249,120 A | * | 9/1993 | Foley | 705/1.1 |
| 5,414,836 A | * | 5/1995 | Baer et al. | 714/38 |
| 5,640,501 A | * | 6/1997 | Turpin | 715/224 |
| 5,659,723 A | * | 8/1997 | Dimitrios et al. | 1/1 |
| 5,819,092 A | * | 10/1998 | Ferguson et al. | 717/113 |
| 5,878,400 A | * | 3/1999 | Carter, III | 705/20 |
| 6,330,552 B1 | * | 12/2001 | Farrar et al. | 705/400 |
| 6,636,880 B1 | * | 10/2003 | Bera | 708/206 |
| 7,593,871 B1 | * | 9/2009 | Mesaros | 705/26 |
| 2002/0065740 A1 | * | 5/2002 | Dunn | 705/26 |
| 2002/0072956 A1 | * | 6/2002 | Willems et al. | 705/10 |
| 2003/0105771 A1 | * | 6/2003 | Tiefenbrun et al. | 707/103 R |
| 2003/0158784 A1 | * | 8/2003 | Shaver et al. | 705/26 |
| 2003/0200185 A1 | * | 10/2003 | Huerta et al. | 705/400 |
| 2004/0267674 A1 | * | 12/2004 | Feng et al. | 705/400 |
| 2006/0155654 A1 | * | 7/2006 | Plessis et al. | 705/400 |
| 2007/0226155 A1 | * | 9/2007 | Yu et al. | 705/400 |

\* cited by examiner

*Primary Examiner* — Brian Epstein
(74) *Attorney, Agent, or Firm* — Kenyon & Kenyon LLP

(57) ABSTRACT

Electronic editor for formulae for calculating the price of a service designed to define the formula in a format directly readable by an electronic costing system designed to establish the price of a service using information on the service consumed contained in consumption variables. The editor includes an electronic calculator capable of defining the calculation formula and storing it in the first storage unit for storing information. The calculator includes an acquisition module having a tree structure formed from nodes, each node being associated with a calculating operation designed to be executed by the costing system to establish the price of the service and defining the order for carrying out the operations by the electronic costing system, and a module for automatically converting the acquired tree structure into a directly readable format by the electronic costing system and storing the converted tree structure in the first storage unit.

20 Claims, 3 Drawing Sheets

EDITOR AND METHOD FOR EDITING FORMULAE FOR CALCULATING THE PRICE OF A SERVICE AND A SYSTEM FOR AUTOMATIC COSTING OF A SERVICE

BACKGROUND OF THE INVENTION

The invention relates to an electronic editor for formulae for calculating the price of a service, designed to define said formula in a format which can be read directly by an electronic costing system, the electronic costing system being designed to establish the price of a service using information on the service consumed, contained in consumption variables and by means of said formula, said editor comprising an electronic calculator capable of defining the calculation formula and of storing it in the first means for storing information.

DESCRIPTION OF THE RELATED ART

Nowadays, many on-line services are accessible by means of the World Wide Web. The payment of these services is also made on-line and automatic costing systems are available for this, associated, for example, with invoicing systems.

The purpose of automatic costing systems is to establish the price of the service consumed or to be consumed which is to be invoiced by the invoice system. This price is calculated using information on the service consumed contained in consumption variables and rules for calculating a predetermined price.

To define these rules for calculating a price in an electronic format which might be used by automatic costing systems, an editor for calculation rules is required. In these editors, the electronic calculator is conventionally a computer on which software for editing calculation rules is executed and the storing means are formed using the hard drive of this computer.

The known editors allow a user to enter calculation rules associated with levels of priority. The calculation rules are in the format:

If Condition 1 exists, then Action 1 takes place
where:
  Condition 1 is a logical function of which the result is True or False and
  Action 1 is a mathematical function of the calculation of a price.

The mathematical function, like the logical function, comprises variables designed to be replaced by the value of a consumption variable when the price is calculated using this rule by automatic costing systems.

The priority levels allow possible conflicts or contradictions between a plurality of rules to be resolved by assigning a priority level to each of them. The priority level allows automatic costing systems to determine, amongst the rules capable of being applied, which has to be executed first. Therefore, the priority levels determine the order of execution of the different rules by the costing systems.

Nevertheless, the results obtained with the known editors are unsatisfactory. In fact, the more it is necessary to create a large number of rules for calculating a price, the greater the chance of creating conflicting rules and the more difficult the management of these conflicts by means of priority levels proves to be. Errors in the priority levels of the rules lead to incoherent functioning or to a disfunctioning of the automatic costing systems which execute them.

SUMMARY OF THE INVENTION

The invention aims to remedy this disadvantage by proposing an editor simplifying the definition of a formula for calculating the price of a service in a format which can be read by an automatic electronic costing system of this service.

The invention therefore relates to an editor such as described above, wherein the calculator comprises:
  an acquisition module for said formula in the form of a tree structure formed from nodes, connected to one another by arcs, each node being associated with a calculating operation designed to be executed by the costing system to establish the price of the service and the relationship between the arcs of the nodes defining the order, by means of an ordered relationship, in which said operations have to be carried out by the electronic costing system, and
  a module designed to convert automatically the acquired tree structure into a format which can be directly read by the electronic costing system and to store the converted tree structure in the first means for storing information.

By means of the above editor, the formula to calculate the price of a service is entered by the user in the form of a tree structure. This arrangement which follows a tree structure allows the order in which the operations for calculating a price have to be executed by the costing system to be defined simply and graphically, without having to define specifically the priority levels. In the above editor, it is the position of the node in the tree structure which also defines the context in which an operation for calculating a price has to be executed by automatic costing systems. Thus with such an editor, it is no longer necessary to allocate specifically the priority levels, as in the known editors.

According to further features of the editor according to the invention:
  the calculator comprises a module for displaying the tree structure during acquisition or when acquired;
  the acquisition module is capable of creating, under the control of a user, a first-level node in said tree structure, solely associated with an operation for activating child nodes of this node in response to receiving a new value for one of the consumption variables processed by a calculating operation associated with one of the child nodes;
  the acquisition module is capable of creating, under the control of a user, a first-level node in said tree structure, solely associated with an operation for activating its child nodes and the calculation operation associated therewith, at predetermined time intervals;
  the acquisition module is capable of creating, under the control of a user, a processing node in said tree structure, solely associated with an operation for calculating a new value using the values of the consumption variables and pre-existing calculated variables and for allocating this new value to a consumption variable or to a pre-existing or new calculated variable;
  the acquisition module is capable of creating, under the control of a user, a decision node associated solely with a conditional activation operation of all of its child nodes and the calculating operation associated therewith, using the value of a consumption variable or a calculated variable;
  the acquisition module is capable of creating, under the control of a user, a split node solely associated with an operation for extracting, using the value of a consumption variable or a calculated variable, a range of values either between a lower limit and an upper limit, or outside these limits, the child nodes processing the value range extracted;

the acquisition module is capable of creating, under the control of a user, a node in the tree structure solely associated with an operation for unit conversion of a calculated value;

the acquisition module is capable of creating, under the control of a user, an ending in the tree structure solely associated with an operation for calculating a price and with an operation for stopping the costing system from passing through the tree structure;

it comprises second means for storing information containing a library of pre-stored nodes associated respectively with pre-defined parameterisable operations and the acquisition module comprises a sub-module for selecting nodes contained in the library, a sub-module for connecting the nodes selected with the aid of the selection sub-module to a father node and a sub-module for parametering parameterisable operations associated with the nodes of the library.

The invention also relates to an electronic costing system designed to establish automatically the price of a service using information on the service consumed, contained in consumption variables and with the aid of a calculation formula determined by an electronic editor, according to any of the preceding claims, the system comprising:

a receiver for information on the service consumed capable of storing this information in the consumption variables, means for storing information containing the formula for calculating the price of the service, wherein it comprises an electronic calculating unit capable of executing the operations associated with the nodes and endings of the calculation formula, in response to the information received by the receiver, so as to pass through the tree structure of the calculation formula, from the root node to at least one of the endings by executing successively the conditional activation operation of the father nodes then solely the conditional activation operations associated with the activated child nodes until they activate at least one ending associated with an operation for calculating a price and execute it to establish automatically the price of the service.

The invention also relates to a method for defining a formula for calculating the price of a service in a directly readable format by an electronic costing system, the electronic costing system being capable, with the aid of this formula, of establishing the price of a service using information on the service consumed contained in the consumption variables, wherein it comprises:

an acquisition step for said formula by an electronic calculator, in the form of a tree structure formed using nodes connected to one another by arcs, each node being associated with an operation designed to be executed by the electronic costing system to establish the price of the service and the relationship between arcs of the nodes defining the order, by means of an ordered relationship, in which said operations have to be carried out by the electronic costing system, and an automatic conversion step by the electronic calculator of said acquired tree structure in a format directly readable by the electronic costing system and for storing the converted tree structure in the means for storing information.

According to other features of the method according to the invention:

the acquisition step comprises:

a sub-step of selecting a node in a library of pre-stored nodes, the pre-stored nodes being associated respectively with pre-defined parameterisable operations, a sub-step of connecting the selected node, during the selection sub-step, to a father node, a sub-step of parametering the operation of the node connected to the father node during the connection sub-step.

BRIEF DESCRIPTION OF THE DRAWINGS

The invention will be better understood by reading the description which follows, given solely by way of example, and made with reference to the drawings, in which.

DESCRIPTION OF THE PREFERRED EMBODIMENTS

In the continuation of this description, a tree structure is defined as being a structure formed by nodes connected to one another by arcs. In this structure, with the exception of the root node, each node is connected on the left side to a single father node. On the right side, each node is connected to either nothing, to a single child node or a plurality of child nodes. A node is said to be an 'ending node' when it is connected on the left side to a single father node with no child node on the right side. An ending node therefore forms the end of a branch of the tree structure.

The orientation of the tree structure from left to right is selected here merely by way of illustration and the technical teaching described here also applies to tree structures oriented in other directions.

Figure 1:
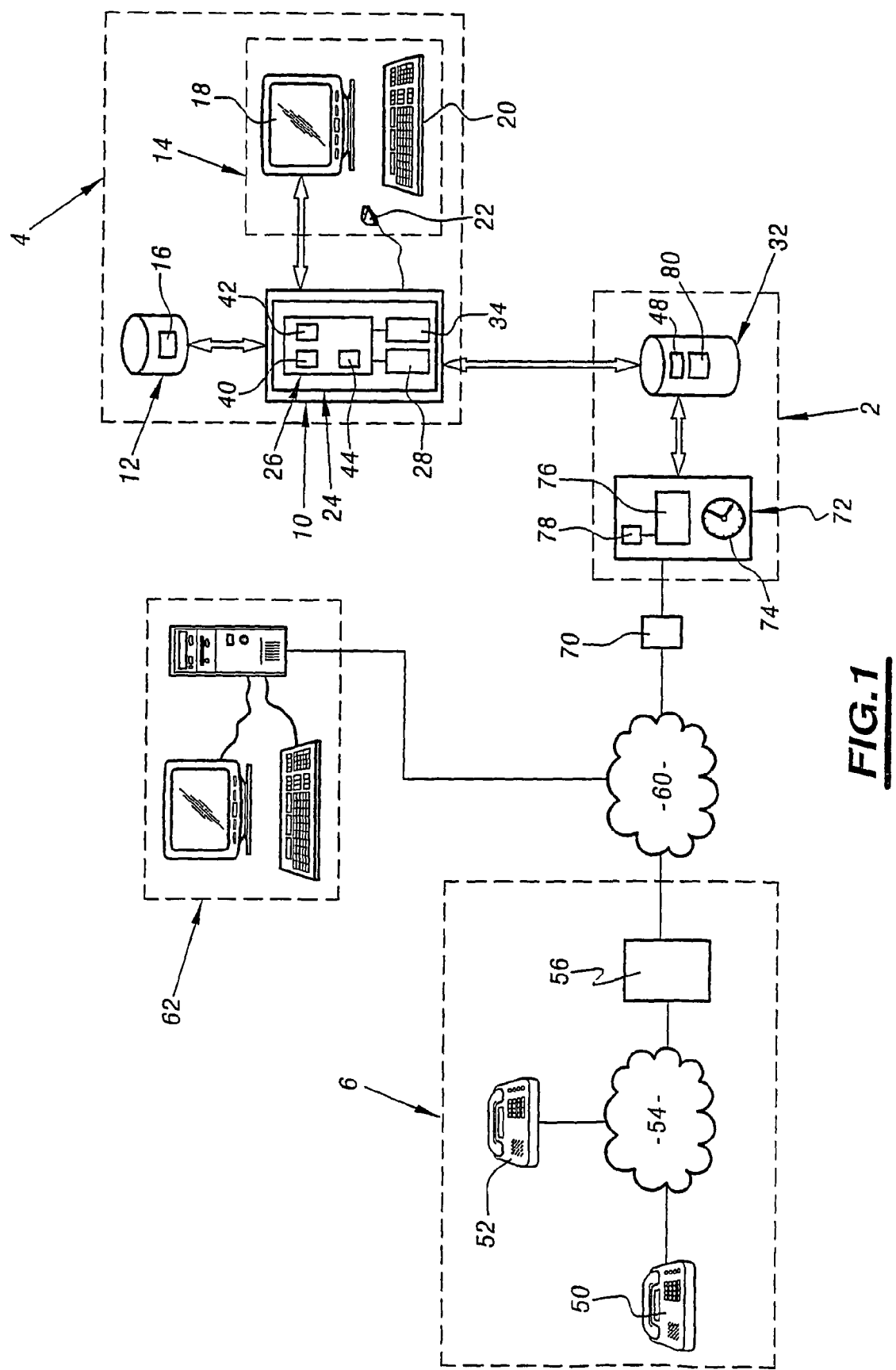
FIG. 1 is a diagrammatic view of the structure of an automatic costing system for a telephone service associated with an editor for formulae for calculating the price of this service, the system and the editor being according to the invention.

FIG. 1 shows an automatic electronic costing system 2 and an electronic editor 4 for calculation formulae used in calculating the price of telephone calls made by means of a telephone network 6.

The editor 4 for calculation formulae comprises an electronic calculator 10 associated with first means 12 for storing information and with a user interface 14. The means 12 for storing information, formed for example by a memory, comprise a pre-stored library 16 of nodes.

The pre-stored nodes form generic models of nodes designed to be copied and of which the copies are designed to be assembled in a tree structure.

These pre-stored nodes are each associated with a pre-defined parameterisable operation. Each of these parameterisable operations, once the parameters have been defined, corresponds to an operation designed to be executed by the system 2, when the corresponding node is activated.

The parameterisable operations are designed to react according to the information contained in or received by the system 2 or to process this same information. In the system 2, each piece of information is stored in a variable associated with a name allowing it to be identified individually. Thus one of the principal parameters of each operation is the name or names of the variables which the operation has to process and/or the name or names of the variables according to which the operation has to be activated. These variables are stored together in what is called here a costing context.

The library 16 principally comprises five families or types of nodes. The first family comprises a single node called the 'root'. The principal and for example the only function of this root node is to form the root a tree structure.

The second node family brings together so-called first-level nodes associated with an operation designed to activate child nodes in response to an event. This event is, for example, receiving information on the consumption of a service. In this case, this first-level node will be called hereinafter 'event node'. The event processed by the event node is either an ordinary event such as, in the example disclosed here, the receiving of information on a telephone call, or an exceptional event such as, for example, the receiving of information on the termination of a contract.

A further example of a first-level node is a recursion node which will be described below.

The third family of nodes brings together so-called processing nodes, associated with operations designed to calculate new values for variables and to store them in the costing context. Once the processing operation has been executed, these nodes are designed to activate their child nodes. A converter and a processing node are examples of nodes belonging to this family and are described below in more detail.

The fourth family is formed by decision nodes having the common feature that they are each associated with a conditional activation operation of all the child nodes. This conditional activation operation is dependent on the values of the variables in the costing context. These nodes do not modify the costing context. Two examples of this family of nodes, i.e. a decision node and a split node are disclosed below.

Finally, the last family of nodes are the endings. Each ending is an ending node associated with an operation for calculating a price and/or an amount using values of variables in the costing context. A common feature of these endings is that they are designed to stop the costing system from passing through the tree structure. An example of an ending for calculating a price is also disclosed below.

In this case, by way of example, the library 16 comprises the following nodes: a converter, a processing node, an ending for calculating a price, a decision node, a split node and a recursion node.

The converter is a node associated with an operation for converting a variable of the costing context into a converted variable. The pre-defined operation associated with the converter accepts as a parameter the name of the variable in the costing context, the mathematical function to be executed to convert the variable and the name of the converted variable in which the result of the conversion operation is stored once it has been executed.

The converter is, for example, designed to carry out scaling up or down, unit conversions or calculations of the age of a file knowing the date it was created.

The processing node is for example designed to calculate, from successive values of one or more variables in the context of costing calculations, a change in this value stored in a changing variable. This operation accepts as parameters the name or names of the variables, a mathematical calculating function allowing the current value of the calculation variables to intervene, in addition to one or more of their previous values and the name given to the changing variable.

This processing node is specifically designed to carry out cumulative operations or statistical operations such as averaging or others using arithmetical operations, for example.

The ending for calculating a price is associated with an operation for calculating a price and storing it in a price variable using the values of one or more variables of the costing context. In a similar manner to the preceding nodes, the variables, the mathematical calculating function linking the variables and the name of the price variable are parameterisable. This calculation ending is designed to form an ending node of the tree structure and forms a breakpoint for the execution of the tree structure by the system 2.

The decision node is associated with a conditional activation operation of all the child nodes or daughter endings connected thereto. The activation of the child nodes is only carried out if an activation condition is satisfied. This activation condition is formed by one or more variables in the costing context connected to one another by a logical function of which the result is 'True' or 'False'. The parameters of this conditional activation operation are therefore the name or names of the variables and the logical function. The logical function is typically carried out with the aid of boolean operators.

This decision node therefore constitutes an interruption in the path of the tree structure, namely the child nodes or daughter endings are not passed through if the activation condition is not satisfied.

The split node is a specific decision node associated with an operation for extracting, from the value of a variable in the costing context, a range of values between either a lower limit and an upper limit, or outside these limits. Only the range of values extracted is processed by the child nodes or daughter endings attached to this node. The parameters of this operation are the value of the lower limit, the value of the upper limit and the name of the calculation variable. In the embodiment disclosed here, the lower limit or the upper limit can be equal to infinity.

These split nodes are for example designed to produce the rules for calculating graduated prices. Thus these split nodes allow the following calculating operations to be easily carried out: the ten first products cost 10€each, whilst the products over this threshold of 10 cost 5€each. A more detailed example of their implementation will be disclosed with reference to FIG. 2.

The recursion node is associated with an operation for periodically activating all the child nodes and reinitialising variables in the costing context such as the changing variables. The principal parameters to be defined for this node are the frequency and the name or names of the variables to be reinitialised after the periodic calculations have been carried out. This node is designed to carry out the calculation of the price made periodically. For example, this recursion node allows the activation of the calculating operations necessary for invoicing a telephone subscription at each end of month.

The user interface 14 comprises a screen 18, a keyboard 20 and a computer mouse 22. The components of the user interface 14 are conventional and connected to the calculator 10.

The calculator 10 is designed to define a formula for calculating a price stored in an electronic format which can be directly read by the system 2. For this purpose, it is, for example, capable of executing software 24 for editing calculation formulae. This software 24 comprises in particular an acquisition module 26 for a tree structure associated with a module 28 for storing this tree structure in second means 32 for storing information. The software 24 also comprises a display module 34, in a graphic form on the screen 18, of the tree structure during acquisition or when already acquired.

The acquisition module 26 comprises a sub-module 40 for selecting and copying a node in the library 16, a sub-module 42 for connecting the nodes and a sub-module 44 for parametering the nodes.

The selection sub-module 40 is capable of selecting, under the control of a user, one of the types of nodes stored in the library 16 and of creating a copy in a working space which can be displayed by the module 34. The connection sub-module 42 is capable of connecting the nodes present in the working space to one another by arcs, under the control of the user, so as to create a tree structure. Advantageously, the selection sub-module 40 and the connection sub-module 42 are adapted so that the user can construct in the displayable working space a tree structure solely using the mouse 22. For this purpose, these modules 40 and 42 use similar techniques to those of Windows 'Explorer', i.e., for example, techniques known by the terms 'cut and paste' or 'drag and drop'. The sub-module 44 for parametering is adapted so that a user of the editor 4 of calculation formulae can define the parameters of the operations associated with nodes forming the tree structure.

The storage module 28 is designed to transfer automatically the tree structure acquired by means of the module 26 into a tree structure 48 stored in the means 32 for storing information in a readable format without further human intervention by the system 2. During this step 88, the module 28 automatically converts the tree structure entered by the user into a format which can be directly read by the system 2 and stores the tree structure thus converted in the means 32 for storing information, for example, the acquired tree structure is transformed automatically into JAVA code from Sun Microsystems, in which each node corresponds to an object having as its attribute:
 a pointer toward the father node,
 a pointer toward the child node and
 a feature containing the parametered operation to be executed.

This Java code can be directly processed by any calculator equipped with a Java virtual machine. For more information, the reader can refer to 'The Java Language Specification' by Bill Joy, Sun Microsystems, 2nd Edition.

This module 28 is also capable of being activated by means of the user interface 20.

The telephone network 6 comprises, for example, two telephone points 50 and 52, connected to one another by means of a first network for transmitting information 54.

The information transmission network 54 is also connected to an information server 56. This information server 56 is capable of storing and transmitting numerical values representing information on the service consumed to the automatic costing system 2. For this purpose, the information server 56 is connected by means of a second information transmission network 60 to the automatic costing system 2. The information transmitted by the server 56 in the simplified example disclosed here, are the moment of the start of the call, the moment of the end of the call and the telephone number called for each telephone connection made by means of the network 54.

The information transmission network 60 is also connected to a subscription terminal 62 designed to store new subscribers of the telephone network 6. This subscription terminal 62 is capable of transmitting, by means of the information transmission network 60, information about the subscription to the system 2. It is created, for example, from a conventional computer.

The automatic costing system 2 comprises an information receiver 70 associated with an electronic calculating unit 72, itself associated with the means for storing information 32.

The receiver 70 is capable of receiving information on the service consumed which is transmitted to it by the information server 56 and the subscription terminal 62. It is also adapted to store automatically the numerical values corresponding to the information received on the service consumed in the consumption variables of the costing context. The costing context is, for example, stored in the means 32 for storing information. The system 2 comprises as many consumption variables as items of information on the service capable of being received. Thus, in the example disclosed here, the system 2 comprises four consumption variables V1, V2, V3, V4 corresponding respectively to the moment of the start of the call, to the moment of the end of the call, the number called and the subscription information.

The calculation unit 72 is, for example, produced from a conventional information server comprising a clock 74 designed to indicate the current date and hour and executing software 76 for the automatic costing of a service.

The software 76 is designed to execute each operation associated with an activated node. In particular, since in the case for example of first-level nodes and decision nodes, the operation consists, inter alia, in activating one or more child nodes, the software 76 is thus designed to pass through the tree structure 48 gradually executing the operations associated with the nodes as they are activated. So as to initiate the passing through of the tree structure 48, the software 76 is capable of activating a first-level node in response to receiving a further value for a consumption variable in the case of first-level event nodes or in cooperation with the clock 74 in the case of recursion nodes.

The software 76 is associated with a storage module 78 designed to store the price established by the software 76 in a database 80 contained in the means 32 for storing information. The storage module 76 also stores in the database 80 an identifier of the person to be invoiced at the same time as the price of the service consumed.

The software 76 is adapted to resolve automatically a conflict between a plurality of decision nodes connected to the same father node, each of these decision nodes being associated with an operation for processing the same calculation variable. The software 76 is capable of resolving such a conflict, for example, by activating only the decision node whose conditional activation condition best corresponds to the situation encountered. Thus, only one of the ramifications or branches which extend to the right of the tree structure from the decision nodes in conflict is passed through by the software 76. Thus in the embodiment disclosed here, only the split nodes authorise the passing through by the software 76 of a plurality of the ramifications which extend to the right of the tree structure from the same father node.

The software 76 is also adapted to command automatically the various calculating operations which could be executed simultaneously. For example, in the case where a first and a second calculation operation can be simultaneously executed and or the first operation establishes a calculation variable necessary to carry out the second operation, the software 76 executes firstly the first operation and only then the second operation.

Figure 2:
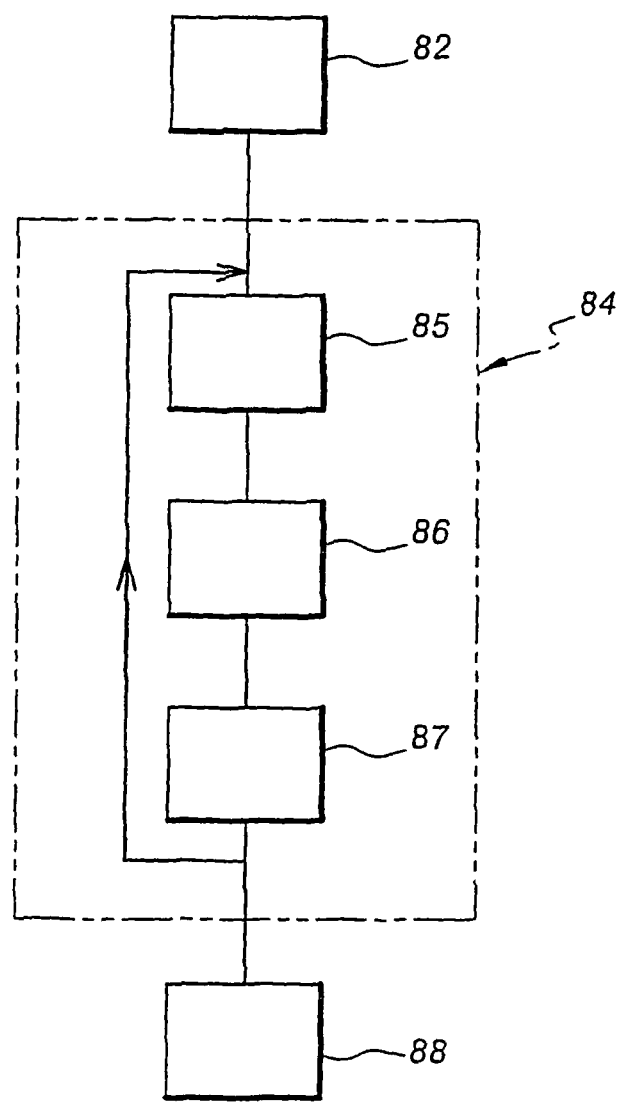
FIG. 2 is flow chart of a method for editing calculation formulae according to the invention.
Figure 3:
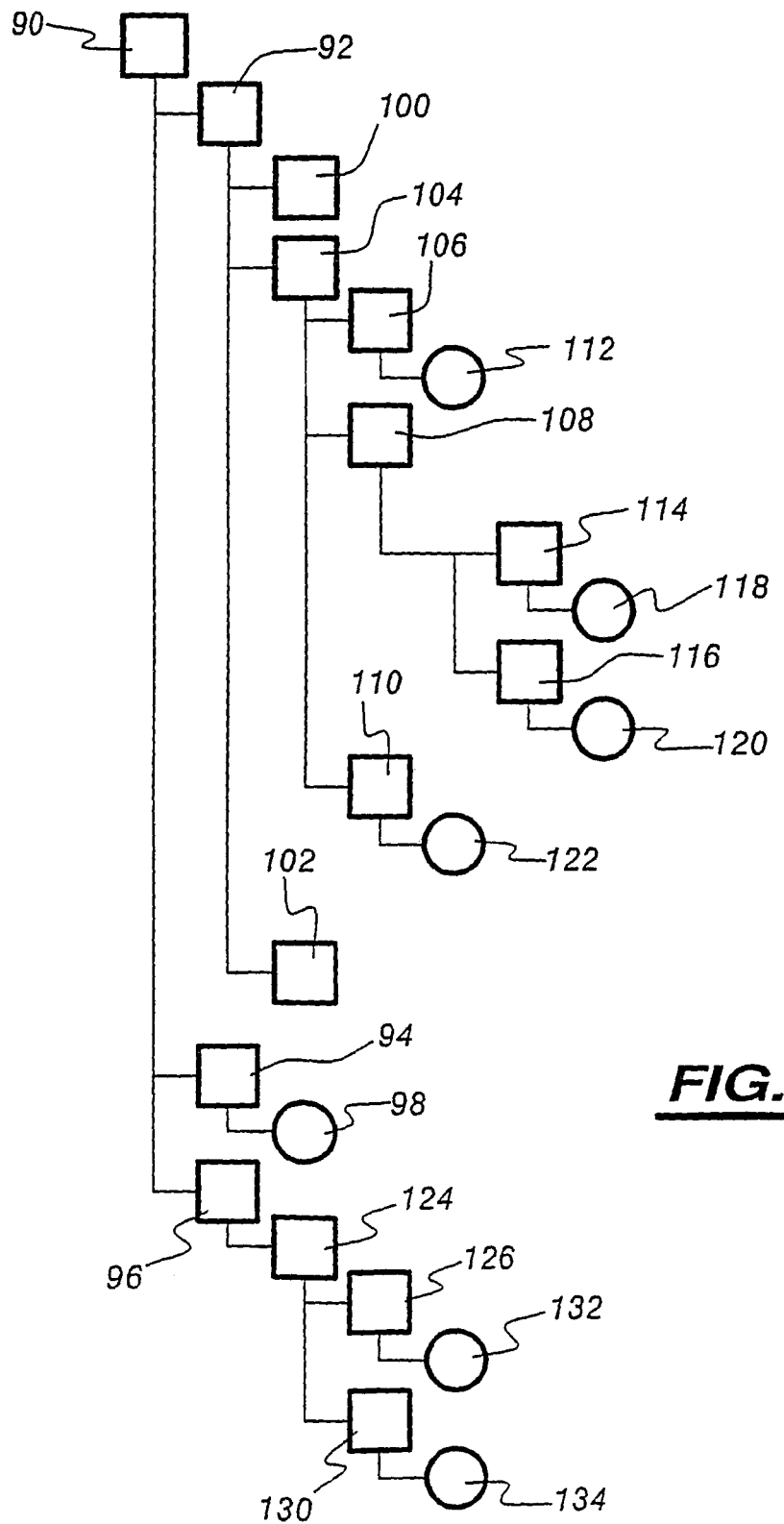
FIG. 3 is a view of a tree structure showing a calculation formula defined by means of an editor according to the invention.

The functioning of the editor 4 for calculation rules and the automatic costing system 2 will now be disclosed with the aid of FIG. 1 and with regard to FIGS. 2 and 3 in the particular case where the services to be costed are those of the telephone network 6.

The first step of initiating the automatic costing system 2 consists in creating the calculation formula with the aid of the editor 4 and to store it in the means 32 for storing information.

To create the calculation formula, a user of the editor 4 begins by a step 82 of creating a root node by selecting, with the aid of the selection sub-module 40, a node from the family of the root nodes. This node is not, for example, associated with any parameterisable operation since its sole function here is to form the root of the tree structure.

The following step is a step 84 for creating a tree structure from the root node previously created. It consists in creating the tree structure and adding child nodes by successive steps.

The addition of a new node to the tree structure begins by an operation 85 of selecting a node in the library 16 by means of the selection sub-module 40. This operation then continues by an operation 86 to connect the node thus selected to one of the nodes of the tree structure with the aid of the connection sub-module 42. Once the new node is connected to a node of the tree structure, the operation associated therewith is programmed with the aid of the parametering sub-module 44, during a parametering operation 87.

It is also possible to carry out the preceding operations in a different order. For example, it is possible to select a node and then to parameter it before connecting it to the tree structure.

Then the preceding operations 85, 86, 87 are repeated to add new child nodes to the tree structure under construction, until the desired tree structure is obtained corresponding to the calculation formula which the system 2 has to implement.

Once the desired tree structure has been created with the aid of the acquisition module 26, it is stored during a step 88. During this step 88, the module 28 automatically converts the tree structure entered by the user into the format directly readable by the system 2 and stores the tree structure thus converted in the means 32 for storing information.

In the particular case disclosed here, the tree structure created with the aid of the editor 4 for calculating rules is for example that shown in FIG. 3.

This tree structure comprises a root node 99. This node allows both the operations designed to be activated in response to the reception of new values for consumption variables and operations designed to be activated periodically to be brought together in the same tree structure.

The node 90 comprises three first-level child nodes 92, 94, 96.

The node 94 is associated with an operation for activating its daughter ending 98 if the updated consumption variable is V4, i.e. that a subscription has been created. The daughter ending 98 is associated with an operation to calculate a fixed price of 20C, whatever the value of the consumption variable V4. This corresponds to an inclusive tariff for putting the telephone line into service.

The node 92 is associated with an operation to activate all the child nodes if the updated consumption variables relate to a telephone call. In this case, therefore it concerns updating the value of the variables V1, V2, V3 indicating respectively the moment of the start of the call, the moment of the end of the call and the number called.

This node 92 is connected at its right to a converter 100, a processing node 102 and a decision node 104.

The converter 100 is parametered so as to calculate the duration of the telephone call from the consumption variables V1 and V2 which represent respectively the moment of the start of the call and the moment of the end of the call. The result of the conversion is stored in a converted variable V5.

The processing node 102 is associated with a cumulative operation of successive values of the variable V5 previously calculated, this cumulative value being stored in a changing consumption variable V6.

The decision node 104 is associated with an operation for activating all the child nodes if the updated consumption variable is the variable V3, i.e. the number called.

It is connected to three child decision nodes 106, 108 and 110.

The node 106 is associated with an operation for activating its daughter ending 112 for calculating a price, if the telephone number contained in the variable V3 begins with '06', i.e. that it is a call to a mobile telephone. The ending 112 is associated with an operation for calculating the price of the telephone call by multiplying the duration of the call V5 by a rate T1.

The decision node 108 is connected to two child nodes 114 and 116. The operation associated with this node 108 is an operation for activating all the child nodes if the telephone number called begins with '0'.

The child nodes 114 and 116 are split nodes of the variable V5, i.e. of the duration of the call, between two intervals, the first interval defining the peak hours whilst the second interval defines the offpeak hours. Thus the node 114 is associated with an operation for extracting the duration of the call which has been carried out in the period from 08.00 to 20.00, whilst the node 116 is associated with an operation to extract the duration of the call which has been made either before 08.00 or after 20.00.

Two endings 118, 120 for calculating a price are respectively connected to nodes 114 and 116. The ending 118 is an ending for calculating a price associated with an operation for multiplying the duration of the call made during peak hours by a rate T2. The ending 120 is associated with an operation for calculating the price formed by a multiplication of the duration of the call made either before 08.00 or after 20.00 by a rate T3.

The node 110 is connected to a daughter ending 122. This node 110 is associated with an operation to activate the ending 122 if the telephone number called begins with 00. The daughter ending 122 is an ending for calculating a fixed price whatever the duration, equal to 0C The node 96 is a recursion node associated with an operation for monthly activation of a child decision node 124 and reinitialisation of the variable V6 once the operations for monthly calculations have been carried out. This node 124 is associated with an operation for unconditionally activating the child nodes 126 and 130.

The child node 126 is a decision node associated with an operation for activating a daughter ending 132 if the cumulative value of the duration V6 is between 0 and 120 mins. The operation for calculating the price associated with the ending 132 is a flat rate of 20C The node 130 is associated with an operation to activate a daughter ending 134 if the cumulative value of the duration V6 is greater than 120 mins. The operation to calculate a price associated with the ending 134 is a flat rate of 10C Thus the combination of nodes 96, 124, 126, 130 and the endings 132 and 134 is designed to carry out the following operation: if the cumulative value of the duration of the telephone calls made during the last month is less than 120 mins, then the subscription is invoiced at 20C, otherwise the subscription is invoiced at 10C Once the calculation formula made with the aid of the editor 4 is stored in the means 32 for storing information, the automatic costing system 2 is ready to function. Thus after each telephone call implementing the information transmission network 54, the following information is transmitted by means of the information transmission network 60 to the receiver 70: the moment of the start of the call, the moment of the end of the call and the number called. The receiver 70 stores this information received in the consumption variables V1, V2 and V3. In this case, by way of example, the moment of the start of the call is 07.50, the moment of the end of the call is 08.10 and the number called begins with 01.

Once the consumption variables are updated, the automatic costing software 76 begins to pass through the tree structure of the calculation formula starting from the node 90 toward the endings. For this purpose, it successively carries out each of the operations associated with the activated nodes. In the example disclosed here, the node 92 is activated, then the endings 100 and 102 and the child node 104 are activated, since it is only a case of updating variables V1, V2 and V3. The activation of the ending 100 causes the software 76 to calculate the duration of the call from variables V1 and V2, i.e. 20 mins in this case, and to store this duration in the variable V5. Then the software 76 executes the operation associated with the ending 102, i.e. it adds the duration V5 to the durations previously calculated for the same user, this cumulative value of durations being stored in the variable V6.

The activation of the node 104 causes the software to activate the node 108 since it is a national call of which the telephone number begins with the numbers 01. This activation of the node 108 then causes the software 76 to activate the split nodes 114 and 116 in addition to their respective ending 118 and 120.

Then the software 76 executes the operation of the ending 118 and calculates the price of the 10 mins of the telephone call which are between 08.00 and 08.10. It also executes the operation associated with the ending 120, and calculates the price of the 10 mins which are between 07.50 and 08.00. Once these two endings have been reached, the system 2 is stopped from passing through the tree structure.

These calculated prices are then stored with the aid of the storage module 78 in the price database 80 to be processed later, for example by an invoicing system.

When the clock 74 of the calculating unit 72 indicates that the end of the month has been reached, the software 76 activates the node 96, then the node 124 and finally either the node 126 if the total duration of the calls made in the preceding month is less than 120 mins or the node 130 in the opposite case. Supposing here that the total duration of calls made during one month is less than 120 mins, then the ending 132 is activated, which causes the automatic costing system 2 to apply the flat rate of 20C

The invention claimed is:

1. A non-transitory tangible computer readable recording medium comprising stored instructions that when executed by a computer, cause the computer to:
   identify, in a pricing formula,
      a price calculation operation to calculate a price from a price input variable,
      a mathematical operation to calculate successive values of a changing value variable, and
      a logical operation to conditionally perform an operation depending on a state of a logical operation input variable;
   select nodes from a node library of pre-stored nodes stored in the computer that are designed to be copied and assembled into a tree structure, at least one of the pre-stored nodes causing execution of a calculating operation by an electronic costing system to establish a price of a service, the selected nodes including a converter node, a processing node, an ending node, and a decision node;
   configure the converter node to store as parameters an initial input variable, the price input variable, and a unit conversion operation to convert the initial input variable to a unit of measurement compatible with the price input variable;
   configure the processing node to store as parameters the changing value variable, changed values of the changing value variables, and the mathematical operation;
   configure the decision node to store as parameters the logical function input variable and the logical operation;
   configure the ending node to store as parameters the price input variable and the price calculation operation;
   link each of the configured converter, processing, decision, and ending nodes to one of the other nodes by arcs;
   create a tree structure from the arcs connecting the selected nodes to one another, the arcs defining, by an ordered relationship establishing a sequence in which an operation stored in a parameter of a respective node is executed, an order in which said calculating operations are carried out by the electronic costing system, wherein the price calculation operation is executed last in the sequence to generate a net price, said tree structure being formed by i) the selected converter, processing, and decision nodes including a root node, father nodes, and child nodes and ii) the selected ending node extending from a respective one of the child nodes, wherein the price calculation operation is executed last to generate a net price;
   display on a screen, in a graphic form, said tree structure;
   convert the created tree structure, displayed in a graphic form, into a format directly readable by the electronic costing system; and
   store the converted tree structure in an information storing medium, wherein,
   the root node forms a root of the tree structure,
   each father node is connected to at least one child node by one of the arcs,
   each child node is connected from one of the father nodes by one of the arcs,
   each ending node forms an end of a branch of the tree structure,
   each of the father nodes and the child nodes being associated with a corresponding one of said calculating operations designed to be executed by the costing system to establish the price of the service, the calculation operations being executed based on the order defined by the arcs, and
   each ending node being associated with a corresponding operation for i) calculating a price and with ii) stopping the costing system from passing further through the tree structure.

2. A recording medium according to claim 1, wherein said instructions further cause the computer to:
   accept a selection of a first-level father node from the node library of pre-stored nodes and form the first-level father node in response, the first-level father node being solely associated with an operation for activating child nodes of said first-level father node in response to receiving a new value for a consumption variable processed by a calculation operation associated with one of the child nodes, wherein the corresponding first-level father node activates the corresponding child nodes in response to receiving the new value for the consumption variable processed by the calculation operation associated with one of the corresponding child nodes, and
   form a connection order between said computer-formed first-level father node and said corresponding child nodes by accepting arcs connecting the computer-formed first-level father node to the child nodes of said computer-formed first-level father node, the arcs defining, by an ordered relationship, an order in which said calculating operations are carried out by the electronic costing system.

3. A recording medium according to claim 1, wherein said instructions further cause the computer to:
   accept a selection of a first-level father node from the node library of pre-stored nodes and form the first-level father node in response, the first-level father node being solely associated with an operation for activating child nodes of the first-level father node and the calculation operation associated therewith, at predetermined time intervals, the corresponding first-level father node activating the corresponding child nodes at predetermined time intervals for the operation associated with the corresponding child nodes, and form a connection order between said computer-formed first-level father node and the child nodes of said first-level father node by accepting arcs connecting the computer-formed first-level father node to the child nodes of said computer formed first-level father node, the arcs defining, by an ordered relationship, an order in which said calculating operations are carried out by the electronic costing system.

4. A recording medium according to claim 1, wherein said instructions further cause the computer to:

accept a selection of a processing child node from the node library of pre-stored nodes and form the processing child node in response, the processing child node being solely associated with a calculating operation for calculating a new value from a values of a consumption variable and pre-existing calculated variables and for allocating the calculated new value to one of i) a consumption variable, ii) a pre-existing variable, and a new calculated variable, and form a connection order between said computer-formed processing child node and at least one node of said tree structure by accepting arcs connecting the computer-formed processing child node to a node of the tree structure, the arcs defining, by an ordered relationship, an order in which said calculating operation is carried out by the electronic costing system.

5. A recording medium according to claim 1, wherein said instructions further cause the computer to:

accept a selection of a decision node from the node library of pre-stored nodes and form the decision node in response, the decision node being solely associated with a conditional activation operation of all of corresponding child nodes and the calculating operation associated therewith, using the value of a consumption variable or a calculated variable, and form a connection order between said computer-formed selected decision node and the child nodes of said computer-formed decision node by accepting arcs connecting the computer-formed decision node to the child nodes of said computer-formed decision node, the arcs defining, by an ordered relationship, an order in which said calculating operations are carried out by the electronic costing system.

6. A recording medium according to claim 1, wherein said instructions further cause the computer to:

accept a selection of a split node from the node library of pre-stored nodes and form the split node in response, the split node being solely associated with an operation for extracting from a value of a consumption variable or a calculated variable, a range of values either between a lower limit and an upper limit, or outside the lower and upper limits, the child nodes processing the range of values extracted, and form a connection order between the computer-formed split node to the child nodes of said computer-formed split node by accepting arcs connecting the computer-formed split node to the child nodes of said computer-formed split node, the arcs defining, by an ordered relationship, an order in which said calculating operations are carried out by the electronic costing system.

7. A recording medium according to claim 1, wherein said instructions further cause the computer to:

accept a selection of a converter from the node library of pre-stored nodes and form the converter in response, the converter being a node solely associated with a calculating operation for unit conversion of a calculated value, and form a connection between the computer-formed converter and a node of the tree structure by accepting an arc connecting the computer-formed converter to the node of the tree structure, the arc defining, by an ordered relationship, an order in which said calculating operation is carried out by the electronic costing system.

8. A recording medium according to claim 1, wherein said instructions further cause the computer to:

accept a selection of an ending node from the node library of pre-stored nodes and form the ending node in response, the ending node being solely associated with a calculation operation for calculating a price and with an operation for stopping the costing system from passing through the tree structure, and form a connection between said computer-formed node and a node of the tree structure by accepting an arc connecting the computer-formed ending node to the node of the tree structure, the arc defining, by an ordered relationship, an order in which said calculating operation is carried out by the electronic costing system.

9. A recording medium according to claim 1, wherein said instructions further cause the computer to:

accept a selection of a parameterisable node from the node library of pre-stored nodes and form the parameterisable node in response, the parameterisable node being associated with a pre-defined parameterisable calculating operation, form a connection order between the computer-formed parameterisable node and a father node by accepting an arc connecting the computer-formed parameterisable node to the father nodes of said computer-formed parameterisable node, the arcs defining, by an ordered relationship, an order in which said calculating operation is carried out by the electronic costing system, and parametering the parameterisable operation associated with the computer-formed parameterisable node by accepting parameters.

10. An electronic costing system for automatically establishing the price of a service using a calculation formula, comprising:

a receiver storing consumption variables containing information on consumption of the service, the receiver being a hardware device;

a storage element containing a tree structure defining a calculation formula for automatically establishing the price of the service, the calculation formula for calculating the price of the service using the information on consumption of the service stored by the receiver, the storage element being a hardware device;

a processing device adapted to:
identify, in a pricing formula,
a price calculation operation to calculate a price from a price input variable,
a mathematical operation to calculate successive values of a changing value variable, and
a logical operation to conditionally perform an operation depending on a state of a logical operation input variable;

select nodes from a node library of pre-stored nodes that are designed to be copied and assembled into a tree structure, at least one of the pre-stored nodes causing execution of a calculating operation by the electronic costing system to establish the price of the service, the selected nodes including a converter node, a processing node, an ending node, and a decision node;

configure the converter node to store as parameters an initial input variable, the price input variable, and a unit conversion operation to convert the initial input variable to a unit of measurement compatible with the price input variable;

configure the processing node to store as parameters the changing value variable, changed values of the changing value variables, and the mathematical operation;

configure the decision node to store as parameters the logical function input variable and the logical operation;

configure the ending node to store as parameters the price input variable and the price calculation operation;

link each of the configured converter, processing, decision, and ending nodes to one of the other nodes by arcs; and create the tree structure, said tree structure being formed by i) nodes including a root node, father nodes, and child nodes and ii) ending nodes, each ending node extending from a respective one of the child nodes, the father, child, and ending nodes connected to one another by arcs, the arcs defining, by an ordered relationship, an order in which said operations are carried out by the electronic costing system, wherein, the root node forms a root of the tree structure, each father node is connected to at least one child node by one of the arcs, each child node is connected from one of the father nodes by one of the arcs, each ending node forms an end of a branch of the tree structure, each of the father nodes and the child nodes being associated with a corresponding one of the calculating operations designed to be executed by the costing system to establish the price of the service, the calculation operations being executed based on the order defined by the arcs, each of the ending nodes being associated with a corresponding operation for i) calculating a price and with ii) stopping the costing system from passing further through the tree structure; and an electronic calculating unit, the electronic calculating unit being a hardware device configured for i) receiving information of the consumption variables from the receiver and receiving the tree structure from the storage unit, and ii) executing operations associated with the father and child nodes and the ending nodes of the tree structure, in response to the consumption variables information received from the receiver, so as to pass through the tree structure of the calculation formula from the root node to at least one of the ending nodes by successively executing conditional activation operations of the father nodes, then, solely conditional activation operations associated with activated child nodes until at least one ending node associated with a price-calculating operation has been activated, and to execute the at least one ending node to automatically establish the price of the service.

11. A method of creating a tree structure from a pricing formula for calculating, on a computerized electronic calculating unit, the price of a service comprising:

identifying, by a processing device, in the pricing formula,
a price calculation operation to calculate a price from a price input variable,
a mathematical operation to calculate successive values of a changing value variable, and
a logical operation to conditionally perform an operation depending on a state of a logical operation input variable;

selecting, by the processing device, nodes from a node library of pre-stored nodes stored in a memory connected to the electronic calculating unit that are designed to be copied and assembled into a tree structure, at least one of the pre-stored nodes being associated with a calculating operation executable by an electronic costing system to establish the price of the service, configure a converter node, by the processing device, to store as parameters an initial input variable, the price input variable, and a unit conversion operation to convert the initial input variable to a unit of measurement compatible with the price input variable;

configure a processing node, by the processing device, to store as parameters the changing value variable, changed values of the changing value variables, and the mathematical operation;

configure a decision node, by the processing device, to store as parameters the logical function input variable and the logical operation;

configure an ending node, by the processing device, to store as parameters the price input variable and the price calculation operation;

link, by the processing device, each of the configured converter, processing, decision, and ending nodes to one of the other nodes by arcs;

creating, by the processing device, the tree structure by accepting the arcs connecting the selected nodes to one another, the arcs defining, by an ordered relationship, an order in which said calculating operations are carried out by the electronic costing system including a sequence in which an operation stored in a parameter of a respective node is executed, wherein the price calculation operation is executed last in the sequence to generate a net price, the nodes connected to each other by the arcs creating the tree structure defining said formula;

displaying, on a screen in a graphic form, the created tree structure; and converting said created tree structure displayed in a graphic form into a format directly readable by the electronic costing system and storing the converted tree structure wherein the electronic calculating unit and the memory are each hardware devices.

12. The method of claim 11, wherein, at least one pre-stored parameterisable node is associated with a pre-defined parameterisable calculating operation, the selection of nodes includes a sub-step of a user selecting, from the node library of pre-stored nodes, the at least one parameterisable node associated with a pre-defined parameterisable calculating operation, the connecting of nodes includes a sub-step of the user connecting the selected parameterisable node to a node of the tree structure, and via the interface with the electronic calculating unit, the user parametering the parameterisable calculating operation of the selected parameterisable node.

13. The method of claim 11, further comprising selecting a plurality of ending nodes storing a plurality of price calculation operations wherein each of the ending nodes are linked to different states of the logical operation input variable to apply a different price calculation operation depending on the state of the logical operation input variable.

14. The method of claim 11, wherein the unit conversion operation calculates an age of a file from an input variable specifying a creation date of the file.

15. The method of claim 11, wherein the unit conversion operation scales the initial input variable.

16. The method of claim 11, wherein the mathematical operation uses a current value of the changing value variable to calculate a new value of the changing value variable to replace the current value.

17. The method of claim 16, wherein the current value of the changing value variable is saved as a prior value prior to replacing the current value with the new value.

18. The method of claim 17, wherein both the current value and the prior value are used to calculate the new value.

19. The method of claim 16, wherein the mathematical operation carries out an averaging of the changing value variable to calculate the new value.

20. The method of claim 16, wherein the mathematical operation carries out an averaging using a prior value of the changing value variable to calculate the new value.

\* \* \* \* \*

UNITED STATES PATENT AND TRADEMARK OFFICE
CERTIFICATE OF CORRECTION

PATENT NO. : 8,719,074 B2 Page 1 of 1
APPLICATION NO. : 10/524534
DATED : May 6, 2014
INVENTOR(S) : Plessis et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1265 days.

Signed and Sealed this
Twenty-ninth Day of September, 2015

Michelle K. Lee
*Director of the United States Patent and Trademark Office*